United States Patent [19]

Wang

[11] Patent Number: 4,472,939
[45] Date of Patent: Sep. 25, 1984

[54] ENERGY CONVERSION SYSTEM

[76] Inventor: Frederick E. Wang, 11816 Caplinger Rd., Silver Spring, Md. 20904

[21] Appl. No.: 496,607

[22] Filed: May 20, 1983

[51] Int. Cl.³ .............................................. F03G 7/06
[52] U.S. Cl. ........................................ 60/527; 60/529
[58] Field of Search .......................... 60/527, 528, 529

[56] References Cited

U.S. PATENT DOCUMENTS

4,117,680 10/1978 Smith ..................................... 60/527
4,246,754 1/1981 Wayman ............................... 60/527
4,275,561 6/1981 Wang .................................... 60/527

Primary Examiner—Stephen F. Husar
Attorney, Agent, or Firm—Armstrong, Nikaido, Marmelstein & Kubovcik

[57] ABSTRACT

A thermal-mechanical energy converting device including a fixed cylinder, a frame mounted to co-axially rotate about the fixed cylinder, at least one wheel rotatably support on the frame, and endless transmission elements of a material having a memory effect capable in the bending mode of converting thermal energy into mechanical energy when heated from a temperature below its transition temperature to a temperature above its transition temperature. The transmission elements serve to drive the wheel and the frame about the cylinder upon the application of thermal energy to the transmission elements. This is accomplished by supplying the thermal energy to the cylinder. The thermal energy is transferred from the cylinder to the transmission elements over at least a major portion of the circumferential contact therewith.

32 Claims, 11 Drawing Figures

ENERGY CONVERSION SYSTEM

BACKGROUND OF THE INVENTION

The present invention relates to an energy conversion system, and more particularly, to an improved thermal-mechanical device utilizing a material having a memory effect.

Various devices are known utilizing NITINOL, a near stoichiometric nickle-titanium alloy (as disclosed in U.S. Pat. No. 3,174,851) to convert thermal energy into mechanical energy. NITINOL exhibits a "memory effect" in various forms by heating the alloy from a temperature below its transition temperature range to a temperature above its transition temperature range. There are two principle ways in which the NITINOL memory effect and its associated force can be used, namely, in the unit directional mode to cause the elongated material to contract and in the bending mode to cause the bent material to regain its original shape.

The most practical of the known devices for utilizing this memory effect of NITINOL is disclosed in U.S. Pat. No. 4,275,561 to the present inventor. The device utilizes the memory effect of a material such as NITINOL in the bending mode by bending it about a relatively hotter wheel which is at a temperature above the transition temperature range of the memory effect material. Thermal energy is transferred from the relatively hotter wheel to the wire over at least the major portion of the circumferential contact of the memory material with the relatively hotter wheel. A larger, relatively cooler wheel is drivingly connected to the relatively hotter wheel by at least one NITINOL transmission element in the form of a wire. Both the hotter wheel and the larger, cooler wheel are mounted for rotation about fixed axes.

Because the relatively hotter wheel is kept at a temperature above the transmission temperature range of the memory effect material, the NITINOL transmission element while bent around the wheel is heated and straightens due to the memory effect. The patent discloses that the relatively hotter wheel can be hollow to permit the flow therethrough of a heated fluid medium. Since the relatively hotter wheel rotates, a sealing, bearing means must be utilized to be able to introduce the heated fluid medium thereinto while permitting the wheel to rotate. Generally, the relatively hotter wheel is supported on a hollow shaft with the hollow shaft itself rotatably supported in sealed bearings to provide a rotatable, sealed connection between the stationary tubular elements serving as an input pipe and output pipe and the rotating input and output sections formed by the hollow shaft. This construction permits into-pumping of the heated fluid medium. However, the necessity of using a sealing, bearing means produces certain problems in the practical construction of a useful device in accordance with this patent in certain uses.

These problems include the possibility of leakage of the heated fluid medium through the sealing, bearing means, the necessity for providing a complex system for lubrication of the bearings, energy losses in the bearing structure which not only is a rotational bearing but also is a seal for the heated fluid medium, and the like.

Further, as higher speeds of rotation of the transmission element made of the memory-effect material are obtained, the problem of cooling the NITINOL transmission element around the relatively cooler wheel becomes more difficult. Some form of cooling means may be necessary which further complicates the structure of the device. That is, cooling means may be necessary because as higher speeds are obtained, the NITINOL transmission element has less time to cool down below its transitional temperature from its contact with the relatively hotter wheel and thus, less thermal energy is lost to the environment. The inability of dissipating heat from the transmission element which is moving faster and faster becomes self-limiting, thereby affecting power output of the device.

SUMMARY OF THE INVENTION

The present invention is therefore concerned with the task of avoiding the aforementioned drawbacks encountered with the above-discussed Prior Art thermal-mechanical device utilizing a material with memory effect. That is, the present invention is concerned with producing a thermal-mechanical energy conversion device operating in the bending mode which does not require a sealing bearing means and thus, avoids problems of leakage and complex structure and provides a device wherein the relatively cooler wheel will not need an external cooling means and will be self-adjusting.

The underlying problems are solved according to the present invention in that the source of heat at a temperature above the transition temperature range of the memory-effect material is stationary. That is, the present invention provides a fixed cylinder means which does not rotate. A memory effect material such as NITINOL wire is used in the bending mode by bending it about the fixed cylinder means which is at a temperature above the transition temperature range of the memory-effect material. Thermal energy is transferred from the fixed cylinder means to a wire or transmission element over at least a major portion of the circumferential contact of the material with the fixed cylinder means. Preferrably, a memory effect material used as a transmission element has its twinning axes aligned at least substantially uni-axially. For example, the NITINOL material in the form of a wire or similar configuration may be extruded so that the twinning axis of the extruded NITINOL wire become aligned uni-axially. However, other means may be used to obtain a memory effect with substantially uni-axially aligned twinning axes. For example, the memory effect material may be continuously cast and made in an appropriate shape as disclosed in U.S. Pat. No. 3,985,177.

The fixed cylinder means of the present invention can be solid or can have a hollow interior to permit the flow therethrough of a heated fluid medium. Since the fixed cylinder means does not rotate, all problems with a sealing bearing means are eliminated. Simple piping may be used. Appropriate baffle means or fingers or the like may be used in the interior of the fixed cylinder means to direct and/or facilitate the thermal transfer from the fluid medium radially outward, thereby further enhancing the transfer of thermal energy to the circumferential surfaces of the cylinder which are in contact with the NITINOL transmission element or elements.

In the preferred embodiment of the present invention, a frame means, somewhat like a ferris wheel, surrounds the fixed cylinder means and rotatably carries thereon at least one relatively cooler wheel. The transmission element or elements encircle both the fixed cylinder means and the relatively cooler wheel frame means. Of course, instead of a ferris wheel-like structure, the frame means can be shaped in the form of a simple crank, having the relatively cooler wheel on the outstanding crank arm with the axis of rotation of the crank being aligned co-axially with the axis of the fixed cylinder means.

The frame means and wheels all being rotatable and rotating around the fixed cylinder means provides a device which is self-adjusting. Since the relatively cooler wheel and the wire will be whirling around the fixed cylinder means and cutting through the air, additional cooling of the wire and the relatively cooler wheel are automatically provided. That is, the faster the frame means, the wire and the outer cooler wheel rotate, the faster they cut through the air and thus the more cooling effect obtained.

Power can be taken off the device very simply by a means engaging with the rotating frame means or, alternatively, if the frame means can be constructed as a planet gear carrier with each of the rotating cooler wheels having gearing as a planet gear. An outer annular ring gear could serve to take the power from the planet gears. The frame means could carry permanent magnets with wire coils being positioned therearound to take off power.

Accordingly, it is an object of the present invention to provide a thermal-mechanical device for converting thermal energy by the use of a memory effect material operating in the bending mode which avoids by simple means the aforementioned shortcomings and drawbacks encountered in the Prior Art.

Another object of the present invention resides in a thermal-mechanical device for converting thermal energy into mechanical energy, which is extremely simple in construction, yet permits the attainment of substantial power outputs with the use of low-grade energy.

A further object of the present invention resides in a thermal-mechanical device for converting thermal energy into mechanical energy which is particularly suitable for applications using low-grade heat energy, such as available from, for example, solar energy, waste heat produced by an internal combustion engine, waste heat from steam turbines, waste heat from nuclear power plants, temperature differences in the ocean, etc.

A still further object of the present invention resides in a thermal-mechanical device for converting low-grade heat energy into substantial mechanical power outputs without the need of complicated structures and/or expensive controls therefor. Still another object of the present invention resides in a thermal-mechanical device for converting thermal energy into mechanical energy which permits an efficient, leakage proof use of the thermal energy contained in fluid media.

A still further object of the present invention resides in a thermal-mechanical device for converting thermal energy into mechanical energy which is self-adjusting.

BRIEF DESCRIPTION OF THE DRAWINGS

These and other objects, features and advantages of the present invention will become apparent from the following description when taken in conjunction with the accompanying drawings wherein.

DETAILED DESCRIPTION OF THE INVENTION

The entire disclosure including the drawings of U.S. Pat. No. 4,275,561, issued June 30, 1981, to the present inventor, is hereby incorporated into the present application in its entirety.

Figure 1:
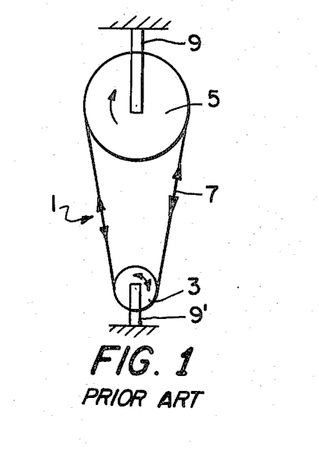
FIG. 1 is a schematic view illustrating the principle of operation of a Prior Art thermal-mechanical device.

Referring now to the drawings wherein like reference numerals are used throughout the various views to designate like parts, and more particularly in FIG. 1, a thermal-mechanical device in accordance with U.S. Pat. No. 4,275,561 is shown. The device 1 comprises a relatively hot wheel 3 opposed by a larger relatively cold wheel 5. A NITINOL wire transmission element 7 drivingly connects the hot wheel 3 with the relatively cooler wheel 5 stationary supports 9 and 9' are provided to rotatably mount the hot wheel 3 and the relatively cooler wheel 5. Assuming that the original shape of the NITINOL transmission element 7 is straight, the latter will be bent as it extends about a portion of the circumference of the smaller wheel 3. As heat is applied to the transmission element 7, the latter will tend to straighten out by unbending, with a release of mechanical force. The device will tend to rotate in either of the directions of rotation as indicated by the arrows on the transmission element 7, the wheel 3 and the wheel 5 if the device is set to rotate. In other words, the thermal-mechanical energy device 1 of FIG. 1 will continue to rotate in the clockwise direction if given an impetus in this direction while heat is transferred from the wheel 3 to the transmission element 7.

Figure 2:
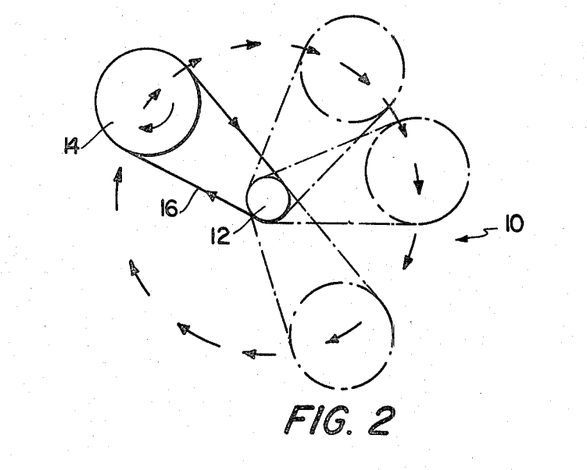
FIG. 2 is a schematic view illustrating the principle of operation of a thermal-mechanical device in accordance with the present invention.

In contrast thereto, the present invention is illustrated schematically in FIG. 2. It is a thermal-mechanical energy device 10 having a fixed cylinder or wheel 12 with a cooler, rotatably mounted wheel 14 orbiting the cylinder 12. A memory effect material transmission element 16 drivingly connects the cylinder 12 with the wheel 14. The cylinder 12 is heated above the transition temperature range of the memory effect material transmission element 16. Assuming that the original shape of the transmission element 16 is straight, the latter will be bent as it extends about a portion of the circumference of the cylinder 12. As heat is applied to the transmission element 16, the latter will tend to straighten out by unbending, with the release of a mechanical force which will not only rotate the wheel 14 about its own axis but orbitally rotate the wheel about the axis of the cylinder.

No particular frame means is shown in FIG. 2; however, it can be recognized that a frame means is necessary for rotatably supporting the wheel 14 at a fixed distance from the axis of the cylinder 12 and permitting the axis of the wheel 14 to rotate about the axis of the cylinder 12. Power may be taken off of the frame means or off of the wheel or wheels 14.

In order to maximize the torque and forces obtainable, it is desirable that the bent portion of the transmission element 16, that is, the portion bent around the wheel 12, has a relatively small radius of curvature to increase the force associated with the unbending of each transmission element upon the application of thermal energy thereto. On the other hand, the transmission element 16 which losses its contact with the circumference of the cylinder 12, is relatively stiff. Consequently, the wheel 14 should be relatively large compared to the cylinder 12 in order to accommodate the stiffness of the transmission element; that is, its resistance to bending around the wheel 14. Another aspect to consider, in an effort to maximize the output obtainable with the device in accordance with the present invention, is the avoidance of slippage between the wheel 14 and the transmission element 16. On the other hand, the slippage problem of the transmission element 16 in relation to the cylinder 12 is of lesser consideration since the primary purpose of the cylinder 12 is to provide, on the one hand, the necessary bending and, on the other, to assist in transferring thermal energy to the transmission element 16. For that reason, the circumferential portion of the cylinder 12, if not the entire cylinder, should be made of material with good heat conducting properties; that is, of a material that readily transfers thermal energy from the cylinder 12 to the transmission element 16.

Figure 3:
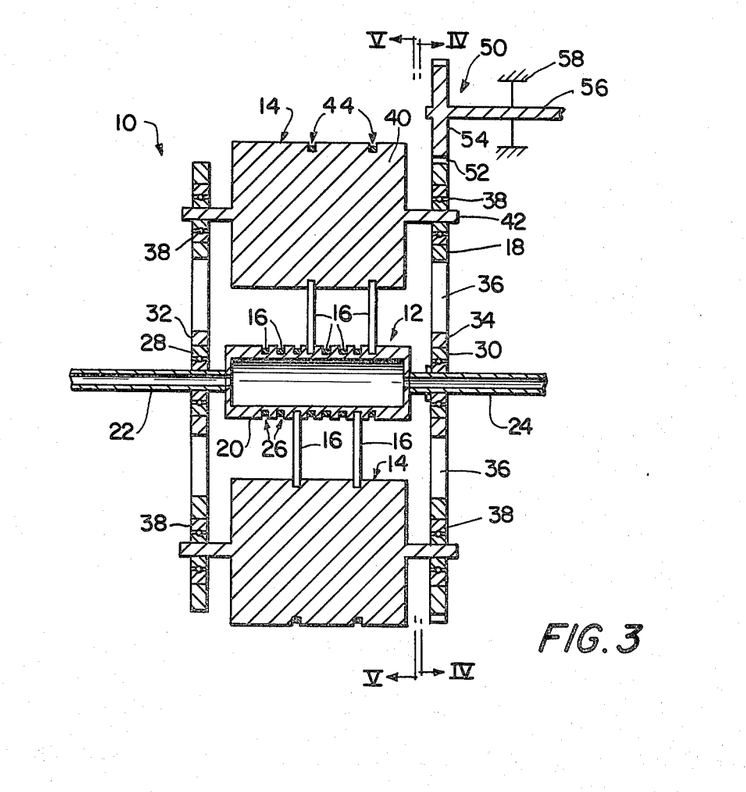
FIG. 3 is a cross-sectional view through one embodiment of a thermal-mechanical device in accordance with the present invention.

FIG. 3 shows in cross-sectional view one embodiment of the present invention. The thermal-mechanical device 10 comprises a fixed cylinder 12, rotatably mounted wheels 14 drivingly connected together by a plurality of transmission elements 16 made of a memory effect material. A frame means 18 rotatably supports the wheels 14 and is mounted to rotate about the fixed cylinder 12.

The cylinder 12 is preferrably made with a hollow interior. As shown in FIG. 3, the cylinder 12 can comprise a metal cylindrical body 20 having an inlet pipe 22 and an outlet pipe 24 connected thereto. The inlet pipe 22 and the outlet pipe 24 can be made of a ceramic material, that is, a thermal insulating material. Alternatively, cylinder 12 can be constructed in any suitable manner such as a welding two disc-like elements interconnected by a hollow cylinder 20. The interconnection can be by any suitable means such as welding, bolting, and the like. The outer circumferential surface of the cylinder 20 can have a plurality of grooves or channels 26 formed therein to direct the path of the transmission elements 16. Alternatively, the surface of the cylinder 20 can have a plurality of raised flanges forming channels 26 for the same purpose. The surface of the cylinder 20, if employed in an embodiment such as that shown in FIGS. 3, 4 and 5 can be a smooth surface as long as the transmission elements 16 from oppositely positioned wheels 40 are alternated along the cylinder 20. Slippage of the transmission elements 16 on the surface of the cylinder 20 is not at all critical to the operation of the present invention.

At the opposite ends of the cylinder 20 can be positioned an inlet pipe 22 and an outlet pipe 24 respectively. These can be any conventional piping means. They are provided for the input and output of the heated fluid medium which can be condensate from a steam turbine, waste heat water from a nuclear power plant, combustion gases from an internal combustion engine, or any other suitable source of thermal energy.

Figure 6A:
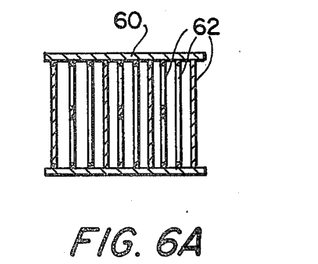
FIG. 6A is a side-cross sectional view of a liner together with certain baffle means useable in the embodiment of the invention shown in FIG. 3.
Figure 6B:
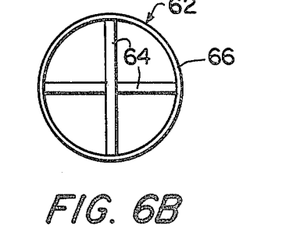
FIG. 6B is a planned view of one of the baffle members of the baffle means of FIG. 6A.
Figure 6C:
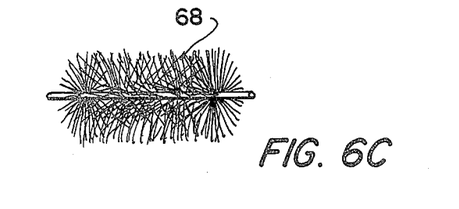
FIG. 6C is a perspective view of a brush-like baffle means useable in the present invention.

The interior of the cylinder 20, may have baffling means or other means for directing the flow of the heated fluid medium through to the circumferential surface of the cylinder, such as shown in FIG. 6A. The baffling means shown in FIG. 6A is a plurality of finger discs 62 which can be seen more clearly in FIG. 6B. Each finger disc 62 has an outer rim 66 and crossing fingers 64. The discs are placed in a replaceable liner 60 or alternatively, can be held by their centers and simply slid into the cylinder 20. The discs 62 are arranged so that the fingers 64 of adjacent discs are staggered in a helical fashion. Alternatively, the fingers 64 of the discs can be staggered in any desired fashion. The flow of fluid media through the device is directed and swirled by the fingers 64. As a further alternative, the baffle means can comprise a brush-like member 68 as shown in FIG. 6C. This can be provided for more uniform and efficient heating of the cylinder.

As noted above, an insertable liner 60 can be used with the cylinder 20 of the present invention. The insertable liner 60 is provided for corrosion protection of the cylinder 20.

Additionally, if some form of baffle means is used, the insert can simply and easily carry the baffles to be placed in the cylinder 20. Preferrably, the insertable liner is pressfit into the cylinder. It can be made of any desirable heat transmitting material such as stainless steel or aluminum depending upon the environment.

Figure 7:
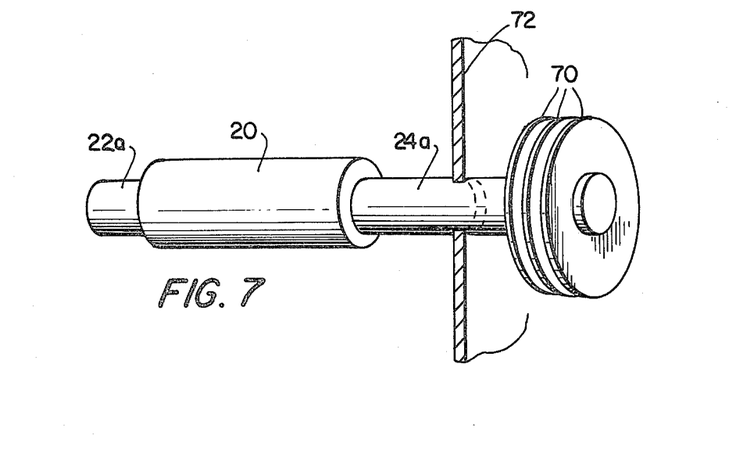
FIG. 7 is a perspective view of part of another embodiment of the present invention.

As an alternative to using a fluid medium flowing through the cylinder 20, heat conduction can be used for the source of thermal energy. As can be seen in FIG. 7, solid rod members 22A and 24A can be connected to a solid cylinder 20A. On either rod 22A or 24A or both, fins 70 can be provided. The rods 22A and 24A should be made of good heat-transmitting material. Either rod can be inserted through an environment barrier 72 such as the sidewall of a tank. The tank can carry hot corrosive liquid or a hot gas environment. Heat conduction through the fins 70 and the rod 24 will provide sufficient heat to the solid cylinder 20A to power the device of the present invention. As a further alternative, solar energy can be used to heat the fins or directly heat either or both solid rods 22A or 24A. For example, semi-circular Fresnell lenses can heat the extensions of the cylinder. In the alternative, semi-circular or parabolic solar reflecting mirrors can be utilized to heat the extension rods. The rods can be simply screw threaded into the cylinder 20A such that they are easily replaceable. As an alternative, they can be machined as an integral part of the cylinder 20A.

Figure 4:
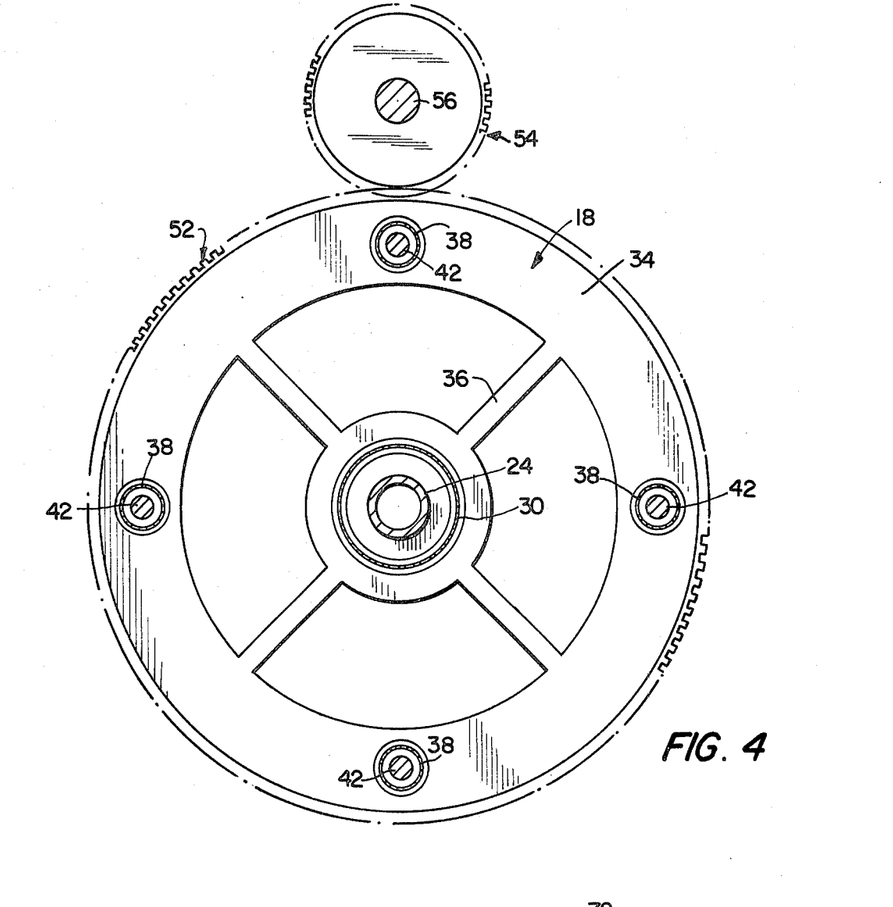
FIG. 4 is a cross-sectional view taken along lines IV—IV of FIG. 3.
Figure 5:
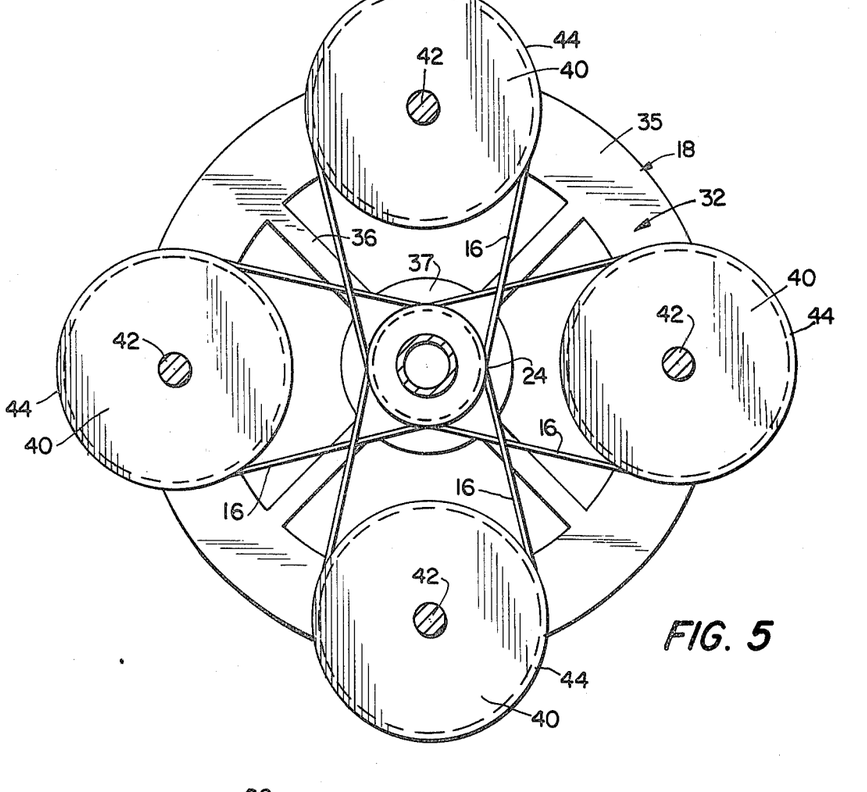
FIG. 5 is a cross-sectional view taken along lines V—V of FIG. 3.

The frame means 18 is shown in FIGS. 3, 4, and 5 as a ferris wheel-like structure including a pair of side plates 32, 34, rotatably mounted on bearings 28, 30 on the inlet and outlet pipes 22, 24, respectively. The bearings can be directly mounted on the inlet and outlet pipes 22, 24. The side plates 32, 34 consists of an outer annular ring 35 connected by a plurality of spokes 36 to an inner annular ring 37. The bearings 28 and 30 are mounted in the inner annular ring 37. At a plurality of positions in the outer annular ring 35, the wheels 14 are mounted.

In the embodiment shown in FIGS. 3, 4, and 5, the wheel means 14 comprises four cylinder-like wheels 40 mounted on axles 42. Any particular number of wheels are suitable. The wheels 40 should be symmetrically positioned about the frame means. Each wheel 40 is shown with two grooves 44 therein for the transmission elements 16 to ride. The axles 42 are rotatably mounted in bearings 38 in the outer annular rings 35. The bearings 38 are shown as ball bearings, however, any suitable form of bearings permitting the wheels 40 to rotate are useable. As noted, each wheel is shown with two grooves 44 for the transmission element 16. Any suitable number of grooves from one to more than one are useable.

While the wheels 40 are shown in FIG. 3 as being solid, they may easily comprise a structure much like that shown in FIGS. 6-8 of U.S. Pat. No. 4,275,561. Each of the wheels 40 can be provided with means to increase the frictional contact thereof with the transmission element 16. This may be done, for example, by roughening the surfaces of the grooves 44 or by coating the surfaces thereof with a suitable material. The wheels 40 can be made of any suitable material such as plastic, metal, or ceramics.

On the other hand, since weight also plays a possible important role, it is also possible to make the wheel as shown in FIGS. 6-8 of U.S. Pat. No. 4,275,561 as an open hollow cylinder having disc-like end members of a light-weight metal such as aluminum or of synthetic resinous material and a circumferential member made of copper, brass, or the like. End disc-like members can also be provided with windows of any suitable configuration to permit the passage of air through the wheel 40 in order to remove as much thermal energy from the wheel as possible. Further, it is also possible to provide a number of suitably shaped cooling ribs which extend radially inwardly beyond the radial outward boundary of any such windows. Such construction is especially suitable because this would tend to make the wheel 40 and the transmission element 16 to be self-adjusting. That is, with the wheel 40 and the transmission element 16 whirling around the cylinder 12 in cutting through the air, cooling the transmission element 16 will be especially effective. The hotter the transmission element 16, the faster it will move through the air and be appropriately cooled. Power may be taken off of the apparatus in any number of suitable ways. For example, the outer annular disc 35 of the end member 34 made integral therewith or mounted thereon. The ring gear can interengage with a power take-off gear 54 mounted on a shaft 56 suitably mounted in a stationary bearing means 58.

The embodiment shown in FIGS. 3-5 could be used, for example, in a cooling system of an internal combustion engine of a motor vehicle, in which at present the heat produced by the engine is completely wasted when given off to the surroundings by means of the radiator. As a matter of fact, the use of a thermal-mechanical energy convertor in accordance with the present invention, could permit a considerable reduction in the size of the radiator and ultimately may permit the complete elimination of the need for such radiator by the conversion of the thermal energy and the coolant of the internal combustion engine into mechanical energy to drive the alternator and/or the compressor of an air-conditioning system in the automobile. The output power obtainable is thereby dependent only on the temperature difference of the fluid medium at the inlet and outlet and the number of NITINOL transmission elements which can be used effectively. Similarly, the thermal energy contained in the exhaust gases of an internal combustion engine or at least a substantial portion thereof can be converted into useful mechanical energy by thermal-mechanical energy devices in accordance with the present invention.

Figure 8:
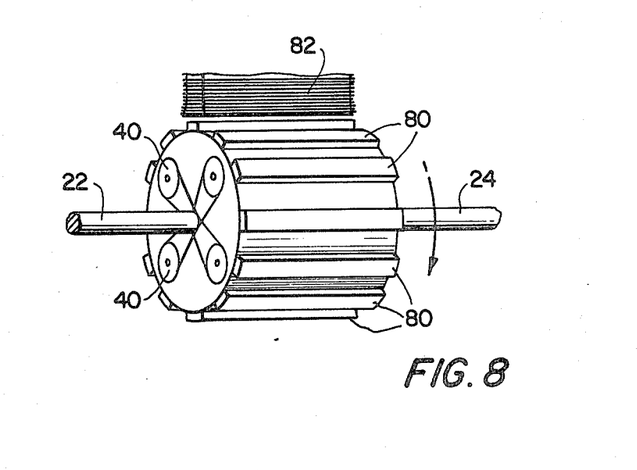
FIG. 8 is a perspective, schematic view of an embodiment of the present invention being utilized as a generator.
Figure 9:
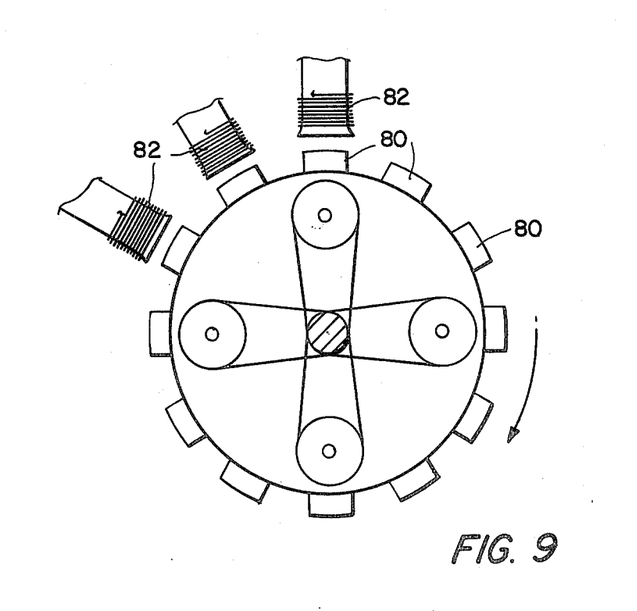
FIG. 9 is a partial cross-sectional, schematic view of the device as shown in FIG. 8.

Alternatively, the embodiment in FIGS. 3-5 could be used directly as a generator of an internal combustion engine of a motor vehicle. Such an embodiment is shown schematically in FIGS. 7 and 8. The fluid media from the cooling system of the engine could be introduced through inlet pipe 22 and exit through pipe 24. A plurality of permanent magnets 80 could be attached to the frame means and rotated by means of the transmission elements and the wheels 40. Completely surrounding the device could be a plurality of coils 82 in which electric current is generated by induction because of the passing of the permanent magnets. Electrical power can be connected from these coils to a load. This would be of considerable benefit in a motor vehicle since it could replace a conventional generator or alternator which draws power from the engine. A device of the present invention when embodied as a generator would merely use waste thermal energy from the engine without drawing any power therefrom.

Additionally, the present invention can permit the recovery of substantial amounts of energy from low-grade heat presently wasted in the cooling systems of nuclear power plants in which the low-grade heat is dumped into rivers, lakes, or the like. Further, solar energy may be effectively converted into mechanical energy by devices of the present invention which are capable of efficiently converting the thermal energy of fluid media, such as water, heated by solar energy. Solar energy can be used directly as described with respect to FIG. 7. Similarly, the temperature differences of water existing at different depths of the ocean may also be used in the present invention as a heat source. Moreover, the invention is equally applicable to waste heat contained in gaseous media, hence the term, "fluid medium" is used herein to designate both gaseous and/or liquid media.

It should be noted that the device of the present invention will operate as long as there is sufficient temperature difference between the at least one relatively cooler wheel and the stationary fixed cylinder means and the transmission element has the appropriate transition temperature range. For example, a device of the present invention would be useable in Alaska in the Winter where the water is approximately 5° C. and the air is approximately −20° C. The water can be passed through the fixed means and the frame means carrying the at least one cooler wheel could rotate in the air.

Examples of other uses would be where the frame means is attached to a rotating portion of a barber pole and a light-bulb is used to heat the center fixed cylinder means. A further alternative would be a circulating fan attached to the chimney pipe of a woodstove.

It should be noted, that the device of the present invention can be used for cooling if the frame means and at least one relatively cooler wheel is driven. The transmission element would operate to cool the fixed cylinder.

The memory effect material used in the present invention is preferably NITINOL. The transition temperature range of NITINOL material can be readily controlled, for example, by the admixture of certain materials such as iron, cobalt, etc., to the basic binary nickle-titanium alloy, as disclosed, for example, in U.S. Pat. No. 3,558,369.

Thus, the present invention offers virtually unlimited possibilities for converting low-grade heat into mechanical energy by an extremely simple means which involve low structural expenditures and obviate the need for large space requirements. Since the NITINOL material is practically without wear over long periods of time due to its hardness and wear characteristics, the device according to the present invention additionally offers the advantage of long service life without the need of frequent servicing. Further, by the elimination of sealing bearing means, further maintenance is eliminated and potential problems are avoided. Moreover, no expensive controls are required for the operation of the device in accordance with the present invention.

It is readily apparent that the above-described energy conversion device meets all of the objects mentioned above and also has the advantage of wide potential commercial utility. It should be understood that the specific form of the invention hereinabove described is intended to be representative only, as certain modifications within the scope of these teachings will be apparent to those skilled in the art.

Accordingly, reference is made to the following claims in determining the full scope of the invention:

What is claimed is:

1. A device for converting thermal energy into mechanical energy, comprising fixed cylinder means, frame means mounted to co-axially rotate about said fixed cylinder means, at least one wheel means rotatably supported on said frame means, and endless transmission means of a material having a memory effect capable in the bending mode of converting thermal energy into mechanical energy when heated from a temperature below its transition temperature to a temperature above its transition temperature, said transmission means having a normal substantially rectilinear shape and operatively connecting said fixed cylinder means and said at least one wheel means to drive said at least one wheel means and said frame means upon application of thermal energy to the transmission means, wherein the transmission means is bent from its normal substantially rectilinear configuration as it passes around said fixed cylinder means and at the same time thermal energy is transferred from said fixed cylinder means to the deformed transmission means over at least a major portion of the circumferential contact of the transmission means with the fixed cylinder means to thereby cause the transmission means to revert to its normal substantially rectilinear shape.

2. A device according to claim 1, wherein the transmission means passes over a substantial part of the circumference of the wheel means and is thereby deformed by bending about at least one axis extending substantially parallel to the axis of said wheel means.

3. A device according to claim 2, wherein wheel means is relatively colder than said fixed cylinder means, said fixed cylinder means having at least an approximately uniform temperature over its circumferential surface.

4. A device according to claim 3, wherein said transmission means is of predetermined configuration in cross-section with the twinning axes at least approximately uniaxially aligned in the direction of movement of said transmission means.

5. A device according to claim 4, wherein said transmission means is extruded so that the twinning axes thereof are substantially aligned uniaxially in the direction of movement of said transmission means.

6. A device according to any one of claims 1, 2, 3, 4 or 5 wherein said material is made of an alloy containing at least nickle and titanium in proportions corresponding approximately to the stoichiometric ratio.

7. A device according to claim 3, wherein the diameter of the wheel means is larger than that of the fixed cylinder means.

8. A device according to claim 7, wherein a number of transmission elements spaced from one another in the axial direction are provided to drivingly interconnect the wheel means with the fixed cylinder means.

9. A device according to claim 8, wherein thermal energy is transferred to the fixed cylinder means by a fluid medium.

10. A device according to claim 9, wherein the fluid medium containing thermal energy flows through the fixed cylinder means.

11. A device according to claim 9, wherein the circumferential surface of the fixed cylinder means is made of a material having good heat-conductivity characteristics and is provided with a number of axially spaced, circumferential channels to guide therein a respective transmission means.

12. A device according to claim 9, wherein the outer surface of the wheel means is provided with a number of axially spaced, circumferential channels to guide therein a respective transmission means.

13. A device according to claim 11, wherein the wheel means is provided with means to increase the frictional contact thereof with said transmission means.

14. A device according to claim 1, further comprising means including a fluid medium for applying thermal energy to said fluid cylinder means.

15. A device according to claim 14, wherein the fluid medium is in heat-transfer contact with external surface means of the fixed cylinder means.

16. A device according to claim 14, wherein the fluid medium is in heat-transfer contact with internal surface means of the fixed cylinder means.

17. A device according to claim 16, wherein the fixed cylinder means is provided with cavity means therewithin to receive the fluid medium through inlet and outlet means in communication with said cavity means.

18. A device according to claim 17, wherein said inlet and outlet means extend substantially in the axial direction of the fixed cylinder means.

19. A device according to claim 18, wherein said fixed cylinder means is supported on a hollow shaft means, at least a part of the inlet and outlet means for the fluid medium being formed by said hollow shaft means.

20. A device according to either claim 17 or 19 further comprising guide means provided in the cavity means to direct the flow of the fluid medium toward the circumferential surface of the fixed cylinder means to enhance the transfer of thermal energy with the circumferential surface of the fixed cylinder means.

21. A device according to claim 20, further comprising means for cooling the circumferential surface of the wheel means.

22. A device according to any one of claims 1, 2, 3, 4, or 5 wherein the wheel means is provided with means to increase the frictional contact of its circumferential surface means with the transmission means.

23. A device according to claim 22, wherein the wheel means includes means providing an enhanced cooling effect on the circumferential surface means thereof.

24. A device according to claim 1, wherein said wheel means includes a plurality of individual wheels each rotatably mounted on said frame means and having an axis in parallel with the axis of said fixed cylinder means, and wherein said transmission means includes a plurality of transmission elements driving connecting said plurality of wheels with said fixed cylinder.

25. A device according to claim 24, wherein each wheel is drivingly connected to said fixed cylinder means by more than one transmission element.

26. A device according to claim 24, further comprising power take-off means operatively coupled with said frame means.

27. A device according to claim 26, wherein said frame means includes a ring gear co-axially mounted thereon, and said power take-off means includes gear means engageable with said ring gear.

28. A device according to claim 15, wherein said external surface means of said fixed cylinder means comprises extension rod members coaxially connected to the fixed cylinder means and extending into said fluid medium.

29. A device according to claim 28, wherein said extension rod members are provided with fins.

30. A device according to claim 1, further comprising axially extending extension members on said fixed cylinder means, and means for heating said extension members.

31. A device according to claim 30, wherein said extension members are replaceably fitted to said fixed cylinder means.

32. A device according to claim 24, further comprising a plurality of permanent magnets mounted on said frame means and a plurality of coils stationarily mounted adjacent said frame means having electrical current induced therein by rotation of the device.

* * * * *